(12) United States Patent
Krejci

(10) Patent No.: US 6,725,519 B2
(45) Date of Patent: *Apr. 27, 2004

(54) METHOD OF FABRICATING A GAS TANK

(76) Inventor: Kyle P. Krejci, 120 W. Shannon St., Gilbert, AZ (US) 85233

( * ) Notice: Subject to any disclaimer, the term of this patent is extended or adjusted under 35 U.S.C. 154(b) by 13 days.

This patent is subject to a terminal disclaimer.

(21) Appl. No.: 10/099,184

(22) Filed: Mar. 14, 2002

(65) Prior Publication Data

US 2002/0121013 A1 Sep. 5, 2002

Related U.S. Application Data

(63) Continuation-in-part of application No. 09/494,479, filed on Jan. 31, 2000, now Pat. No. 6,381,823, which is a continuation-in-part of application No. 29/113,069, filed on Oct. 29, 1999, now Pat. No. Des. 432,486.

(51) Int. Cl.$^7$ .............................................. B21D 39/02
(52) U.S. Cl. ........................ 29/421.1; 29/463; 29/416; 72/60; 72/61; 72/370.22; 220/562; 220/564; 280/835
(58) Field of Search ............................ 29/463, 407.08, 29/416, 421.1; 220/562, 612, 678, 905, 564; 280/830, 835; 72/54, 56, 370.22, 60, 61

(56) References Cited

U.S. PATENT DOCUMENTS

| | | | | |
|---|---|---|---|---|
| 2,439,266 A | * | 4/1948 | Settle | |
| 2,873,519 A | * | 2/1959 | Milne | |
| 3,690,500 A | * | 9/1972 | Remane | |
| 3,734,387 A | * | 5/1973 | Sannipoli | |
| 4,364,161 A | * | 12/1982 | Stading | |
| 4,401,309 A | * | 8/1983 | Matsuzaki et al. | |
| 5,944,216 A | * | 8/1999 | Inaoka et al. | |
| 6,015,183 A | * | 1/2000 | Vlahovic | |
| 6,186,225 B1 | * | 2/2001 | Higgins | |
| 6,381,823 B1 | * | 5/2002 | Krejci | |
| 2003/0172512 A1 | * | 9/2003 | Suarez | 29/421.1 |

FOREIGN PATENT DOCUMENTS

| | | | |
|---|---|---|---|
| JP | 04-254276 | * | 9/1992 |
| WO | 00/23211 | * | 4/2000 |

OTHER PUBLICATIONS

John Godwin, "Hydroforming Techniques" Materials World, vol. 6, No. 8, pp. 483–484, Aug. 1998.*
Klaus Vollrath, "Hydroforming gains ground in Germany" The Fabricator.com, Jan. 24, 2002.*
Taylan Altan, "Hydroforming of passenger car fuel tanks" Stamping Journal, Oct. 24, 2002.*

* cited by examiner

Primary Examiner—David P. Bryant
Assistant Examiner—Eric Compton
(74) Attorney, Agent, or Firm—H. Gordon Shields

(57) ABSTRACT

A method of making a gas tank includes hydroforming two halves and welding the halves together. Two types of welds are used in welding the two halves together, tack welds for holding the two halves together, and stitch welds to complete the welding of the two halves. Additional steps are taken prior to the finishing stitch welds. Reinforcement is added where necessary. Double tanks, for both gasoline and oil, are also fabricated by essentially the same method steps.

19 Claims, 4 Drawing Sheets

METHOD OF FABRICATING A GAS TANK

CROSS REFERENCE TO RELATED APPLICATIONS

This is a continuation-in-part of Ser. No. 09/494,479, filed Jan. 31, 2000, now U.S. Pat. No. 6,381,823, issued May 7, 2002 which was a continuation-in-part application of Ser. No. 29/113,069, filed Oct. 29, 1999, now U.S. Pat. No. Des. 432,486, issued Oct. 24, 2000.

BACKGROUND OF THE INVENTION

1. Field of the Invention

This invention relates to gas tanks and, more particularly, to the fabrication of a gas tank for motorcycles.

2. Description of the Prior Art

There are primarily two types of gas tanks for motorcycles, one fabricated from aluminum and a second fabricated from steel. The gas tanks, regardless of what material they are made out of, are typically formed or stamped and then welded together. Typically, prior art gas tanks have been lap welded. Prior to the present invention, hydroforming techniques have not been used in fabricating motorcycle gas tanks. Different fabricating approaches are used, depending on a particular motorcycle chassis that the tank will be fitted to. The tanks include a tunnel area which receives part of the motorcycle chassis. This tunnel area may present structural and fabrication problems. Prior art gas tanks may be susceptible to vibration and cracking, which results in gasoline leaking from the tank, and this may result in fire problems.

Another problem is simply the structural strength of the tank is important, such as in case of an accident where the tank may break, with the resulting loss of gasoline and the potential for fire.

Welding techniques of the prior art typically use continuous beads and lap welds. This results in heat problems and ultimately results in structural problems in the tanks.

The method of the present invention overcomes the problems of prior art motorcycle gas tanks. Heavier gauge steel is used in the present method, and the specific steps outlined provide a gas tank for a motorcycle which is strong and which may be adapted to different types of motorcycle chassis. Butt welds are used, and the butt welds are stitch welded.

SUMMARY OF THE INVENTION

The invention described and claimed herein comprises a method for making a gas tank for a motorcycle which includes a series of steps beginning with the forming of two halves by hydroforming techniques. The two halves are butted together and tack welded prior to being stitch welded. A reinforcing plate is welded inside the tank at the juncture of the two halves after a bottom tunnel portion is cut from the joined halves. The resulting gas tank is structurally strong.

Among the objects of the present invention are the following:

To provide a new and useful method of making a gas tank;

To provide a new and useful method of making a gas tank for a motorcycle;

To provide a new and useful method of making a gas tank for a motorcycle by hydroforming two tank halves;

To provide a new and useful method of making a gas tank for a motorcycle by stitch welding butted tank halves;

To provide a new and useful method of making a double tank unit including a gas tank and an oil tank; and To provide a new and useful method of forming and welding a motorcycle gas tank.

DESCRIPTION OF THE PREFERRED EMBODIMENT

Figure 1:
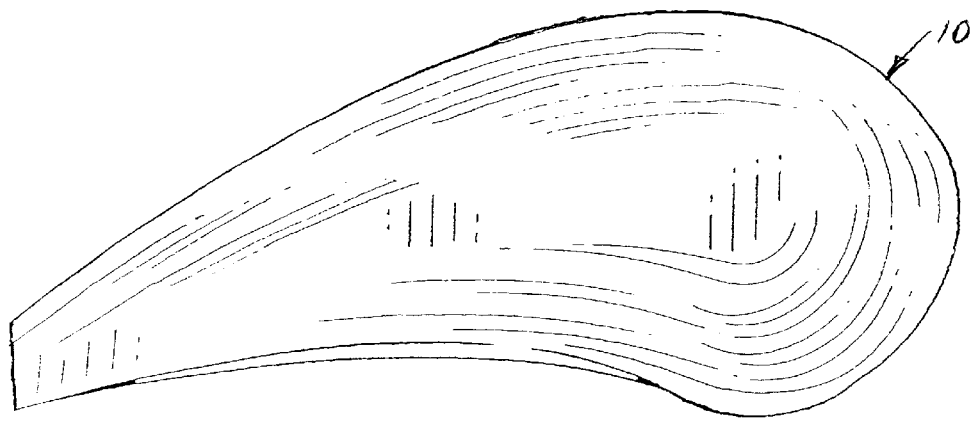
FIG. 1 is a side view of the right half of the gas tank made by the present invention.

The gas tanks made by the method of the present invention are made of sixteen gauge cold rolled steel. This is relatively heavy steel, but it is preferred because of its strength. Even though gas tanks made of sixteen gauge steel are heavier than gas tanks made out of either aluminum or eighteen gauge steel, the strength factor, along with the attendant safety factor, more than overcome the weight disadvantage.

The following table 1 outlines the steps taken in manufacturing a gas tank by the present method.

TABLE 1

1. Stamp both sides
2. Trim excess material from sides
3. Tack weld side halves
4. Cut out bottom tunnel area
5. Add sheet metal panel to inside of tank top portion
6. Weld sheet metal panel to tank
7. Form tunnel
8. Weld tunnel to tank halves
9. Form bottom rear end piece
10. Weld bottom rear end piece to tank halves
11. Weld tank
12. Form mounting brackets
13. Weld mounting brackets
14. Drill mounting brackets
15. Drill crossover holes and petcock hole[s]
16. Position tapped mounting bungs, crossover bungs, and petcock bung[s]
17. Tack weld and weld mounting bungs, crossover bungs, and petcock bung[s]
18. Turn unit over
19. Drill gas cap fitting
20. Clean out unit through gas cap fitting hole
21. Position gas cap fitting
22. Tack weld and weld gas cap fitting

TABLE 1-continued

Figure 2:
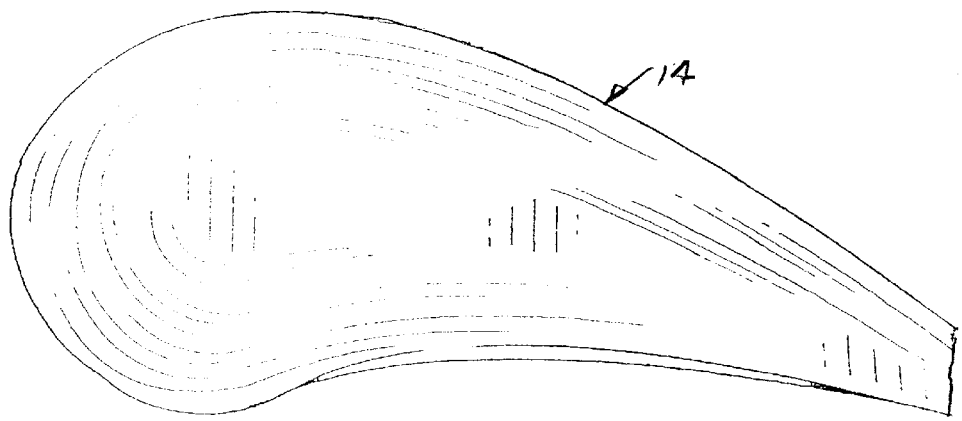
FIG. 2 is a side view of the left half of the gas tank made by the present method.

23. Position seat pocket plate
24. Tack weld and weld seat pocket plate
25. Grind welds
26. Pressure test It will be noted that the gas tanks are formed in halves, and the halves are longitudinal halves. That is, two longitudinally extending halves are formed of the cold rolled steel. The forming is preferably done by stamping both halves, or sides, by hydroforming. Preferably, sixteen gauge cold rolled steel is used in the fabrication of a gas tank. A right side half 10 is shown in FIG. 1 and a left side half 14 is shown in FIG. 2.

Figure 3:
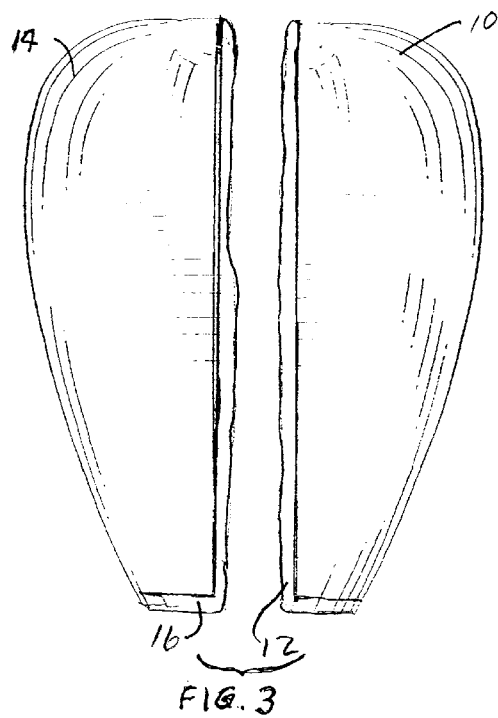
FIG. 3 is a top view of the two halves showing excess material.

The second step is trimming the excess material from the formed sides. The two halves are then butted together and tack welded. TIG (Tungsten Inert Gas) welding is preferably used. FIG. 3 shows excess material 12 and 16 on the halves 10 and 14, respectively.

Figure 4:
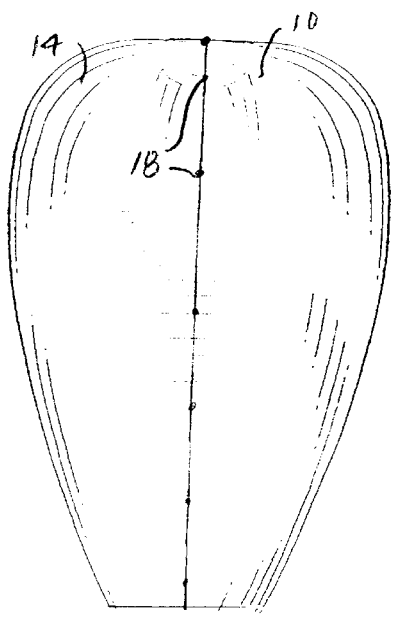
FIG. 4 is a top view of the two halves after tack welding.

FIG. 4 shows the two trimmed halves 10 and 14 butted together and tack welded by tack welds 18.

Figure 5:
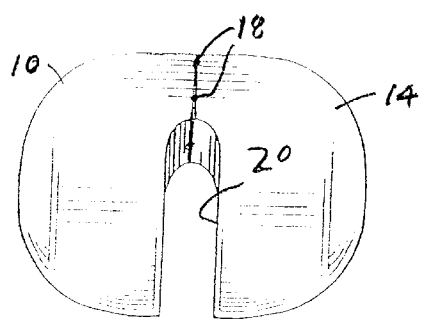
FIG. 5 is a front view of the two tack welded halves with the tunnel area cut out.
Figure 6:
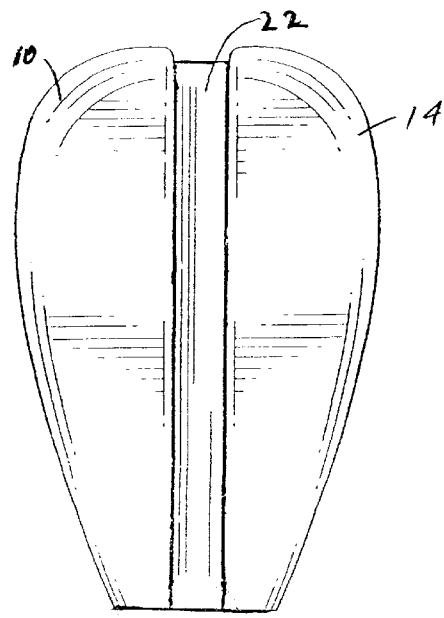
FIG. 6 is a bottom plan view showing a plate disposed against the top or upper portion of the tank.

The tack welded tank is then inverted and a bottom tunnel area 20 is cut from the two tack welded halves. FIG. 5 is a front view of the two halves 10 and 14 with the tunnel area 20 cut from the two halves. With the tunnel area 20 removed from the two halves, a sheet metal panel 22 is added to the inside of the tank top portion. This reinforcing panel 22 is then lap welded to both sides of the tank. The panel 22 is shown in FIG. 6, which is a bottom plan view of the two tank halves 10 and 14.

Figure 7:
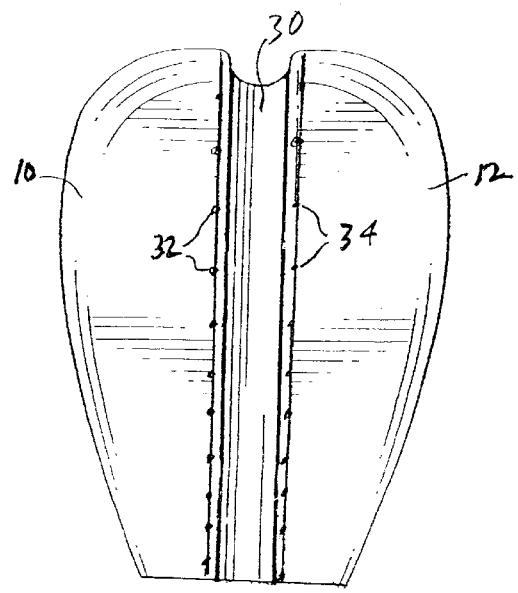
FIG. 7 is a bottom plan view showing a tunnel piece welded in place.

Panels are then added to form the tunnel area and the panels are first tack welded and then welded in place. FIG. 7 shows a formed tunnel 30 secured to the halves 10 and 14 by stitch welds 32 and 34, respectively.

Figure 8:
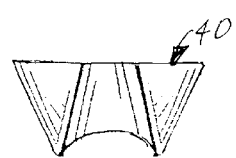
FIG. 8 is a plan view of a rear end piece.

The bottom rear of the tank is then formed, butted against the tank, and tack welded to the two halves. The bottom rear end piece is then welded to the tank. A bottom rear end piece 40 is shown in FIG. 8, which is a bottom plan view of the end piece 40.

Following the welding step of the rear end piece to the tank halves, the tank halves are then welded together in a permanent weld. Stitch welding is used to make certain that the metal does not overheat in the area of the welds. The stitches are overrun to make certain that there are no voids in the weld beads. The overheating of the metal will result in brittleness, which is highly undesirable. Rather, stitch welding techniques are used so that the tank portions have a chance to cool between stitches. This prevents the overheating of the tank and thus avoids the brittleness problem.

Mounting brackets are formed next and then the mounting brackets are welded to the bottom of the tank at the tunnel area. The mounting bracket holes are then drilled, and at the same time the crossover holes and a petcock hole are also drilled. Tapped mounting bungs, crossover bungs, and a petcock bung are then positioned in the drilled holes and are tack welded in place. After the tack welding step, the mounting bungs, crossover bungs, and the petcock bung are finish welded.

Figure 9:
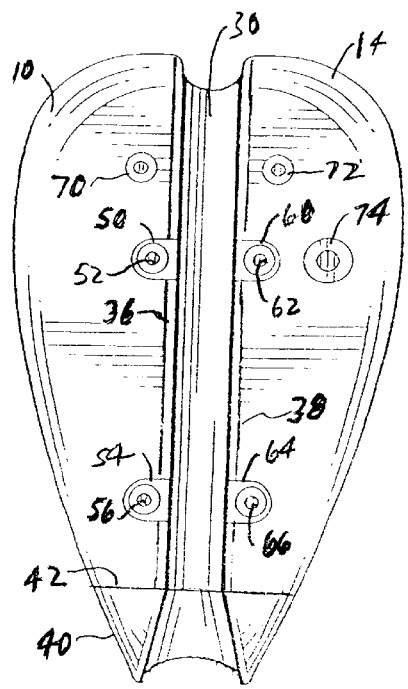
FIG. 9 is a bottom plan view sequentially following FIGS. 7 and 8.

FIG. 9 is a bottom plan view showing a pair of right side mounting brackets 50 and 54 in place, with a pair of mounting bungs 52 and 56 welded to the brackets 50 and 54, respectively. A pair of left side mounting brackets 60 and 64 are also shown with their bungs 62 and 64, respectively. Also shown are crossover bungs 70 and 72, and a petcock bung 74, all welded in place. Finished welds 36 and 38 for the tunnel 30 are also shown.

Figure 10:
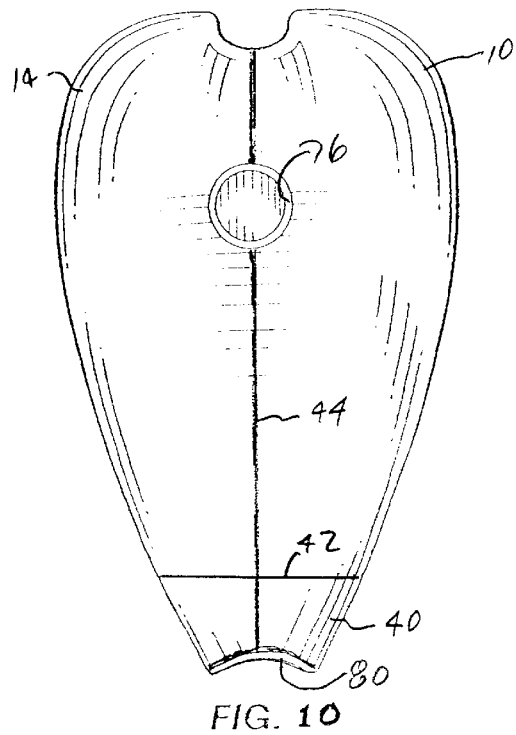
FIG. 10 is a top view sequentially following FIG. 9.

The gas tank unit is then turned over and a gas cap fitting hole 76 is drilled. The unit is then cleaned through the gas cap fitting hole. FIG. 10 shows finished welds 42 and 44 and the gas cap fitting hole 76.

Figure 11:
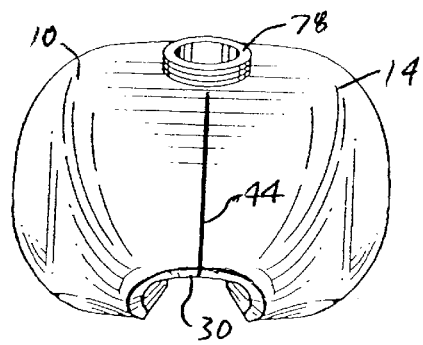
FIG. 11 is a front view sequentially following FIG. 10.

After the interior of the unit is cleaned, a gas cap fitting 78 is positioned in place in the hole, is tack welded, and then is welded in place. This is shown in FIG. 11.

A seat pocket plate 80, shown in FIG. 10, is then positioned, tack welded, and welded in place. FIG. 10 also shows finished welds 42 and 44 for the end piece 40 and the halves 10 and 14.

All of the welds are then ground down as desired and the finished unit is pressure tested. If the pressure test is successful, the gas tank is considered finished and is then ready for shipment, painting, and installation on a motorcycle.

Figure 12:
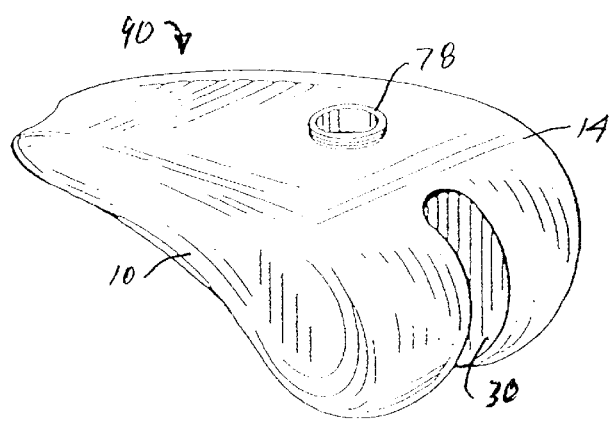
FIG. 12 is a perspective view sequentially following FIG. 11 of the completed tank.
Figure 13:
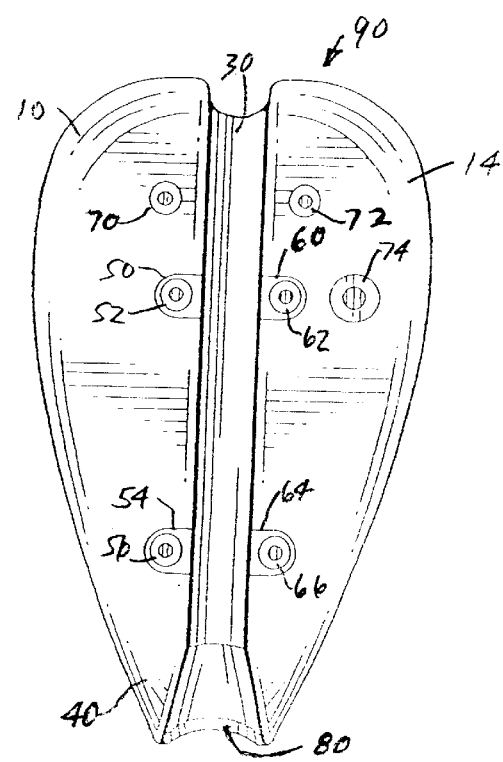
FIG. 13 is a bottom view of the completed tank.

FIG. 12 is a perspective front view of finished tank 90, with the welds ground down, and FIG. 13 is a bottom plan view of the finished tank 90.

In making a double tank unit, that is, a unit that includes a gas tank in the forward portion and an oil tank in the rear portion, the same essential steps illustrated in table 1 are employed, as illustrated in FIGS. 1–13, with the additional steps illustrated in Table 2. However, the steps outlined in Table 2 are added prior to the pressure test step.

TABLE 2

27. Repeat steps 1–26 (from Table 1)
28. Cut off oil portion
29. Clean out unit
30. Cut off side panel for recessed panel
31. Drill holes for return fittings in recessed panel
32. Position, tack weld return fittings
33. Position and tack weld recessed panel
34. Drill fitting holes and oil cap holes
35. Position and weld breather tube
36. Weld plates onto the two portions
37. Weld two portions together
38. Weld recessed panel
39. Weld fittings
40. Position, tack weld, and weld oil cap bung
41. Grind welds
42. Pressure test The first step in making a dual tank unit, after the steps outlined in Table 1, is to cut off the oil portion of the finished tank. The unit is then cleaned out. That is, both the front portion and the rear portion are cleaned out. A side panel is then cut off the rear or oil portion to provide for a recessed panel.

Holes are drilled in the recessed panel for return oil fittings and the return oil fittings are positioned and tack welded onto the recessed panel. The recessed panel is the positioned in the side of the oil tank portion and tack welded in place.

Fitting holes and an oil cap hole are then drilled in the oil tank portion. Next, a breather tube is positioned and welded in place on the inside of the oil portion.

Next, plates are welded onto the two portions. That is, a rear plate is welded onto the gas tank portion and a front plate is welded onto the oil tank portion. The two portions are then welded together. Note that there are two plates or panels that separate the gas tank portion from the oil tank portion.

Following the welding of the two portions together, the recessed panel is welded in place and the fittings are then welded in place in the recessed panel.

Next, the fittings and oil cap bung are welded to the oil tank portion. Then, all of the welds are ground down and a pressure test of the unit is then accomplished.

Once again, if the pressure test is satisfactory, the double tank is considered completed and is ready for shipment, painting, and installation on a motorcycle.

It will be noted, that, if desired, the fabrication of the double tank, the gasoline and oil tank, may omit step 23 of Table 1 before cutting the oil tank portion from the gas tank. If such is done, that step, positioning and welding the seat pocket plate, is then accomplished after step 14 of table 2. That is, the seat pocket plate is positioned and welded prior to grinding off the welds.

While the principles of the invention have been made clear in illustrative embodiments, without departing from those principles there may occur to those skilled in the art modifications of structure, arrangement, proportions, the elements, materials, and components used in the practice of the invention, or otherwise, which are particularly adapted to specific environments and operative requirements. The appended claims are intended to cover and embrace any and all such modifications, within the limits only of the true spirit and scope of the invention.

What I claim is:

1. A method of making a gas tank comprising the steps of:
   providing a quantity of at least sixteen gauge steel;
   hydroforming two side halves of the gas tank from the provided at least sixteen gauge steel;
   tack welding the two side halves together,
   cutting out a portion of the tack welded side halves for a bottom tunnel;
   forming the bottom tunnel;
   welding the formed bottom tunnel to the two side halves;
   forming a bottom rear end piece;
   welding the formed bottom rear end piece to the two side halves; and
   welding the tacked side halves to form a tank.

2. The method of claim 1 which includes the further steps of:
   forming mounting brackets;
   welding the formed mounting brackets to the welded tank;
   drilling holes in the mounting brackets;
   drilling crossover holes and petcock holes;
   placing tapped mounting bungs, crossover bungs, and petcock bungs in the respective drilled holes;
   welding the mounting bungs, crossover bungs, and petcock bungs in their respective holes;
   drill a gas cap fitting hole;
   positioning a gas cap fitting in the gas cap fitting hole;
   welding the gas cap fitting in the gas cap fitting hole;
   positioning a seat pocket plate on the gas tank; and
   welding the seat pocket plate to the gas tank.

3. The method of claim 2 which further includes the step of cleaning out the interior of the welded tank prior to the step of welding the gas cap fitting.

4. The method of claim 2 which further includes the step of pressure testing the tank after welding the gas cap fitting into the gas cap fitting hole.

5. The method of claim 1 in which the step of welding the tacked side halves further includes the step of stitch welding the tacked side halves.

6. The method of claim 1 in which the step of hydroforming two side halves includes the further step of trimming excess material from the hydroformed side halves.

7. The method of claim 1 which further includes the step of welding a sheet metal reinforcing strip to the inside of the two halves after the side halves have been cut to form a bottom tunnel.

8. The method of claim 1 in which the welding steps include stitch welding.

9. The method of claim 1 which includes the further steps of:
   cutting off an oil portion to divide the tank into two portions;
   welding plates to the two portions;
   drilling an oil cap hole;
   welding the two portions together; and
   welding an oil cap bung to the oil cap hole.

10. The method of claim 9 which includes the further steps, after the step of cutting off the oil portion, of:
    cutting off a side panel for a recessed panel;
    drilling holes for return fittings in the recessed panel;
    positioning return fittings in the drilled holes;
    welding the return fittings in the drilled holes; and
    tack welding the recessed panel.

11. The method of claim 10 which includes the further steps of:
    drilling fitting holes; and
    positioning and welding a breather tube.

12. The method of claim 11 which includes the further steps of:
    welding the recessed panel; and
    welding fittings in the drilled fitting holes after the two portions have been welded together.

13. A method for making a motorcycle gas tank comprising the steps of:
    providing a quantity of at least sixteen gauge steel;
    hydroforming two side halves for the tank from the provided at least sixteen gauge steel;
    tack welding the two side halves together;
    cutting out a portion of the welded side halves for a bottom tunnel;
    forming a bottom tunnel;
    welding the formed bottom tunnel to the two side halves; and
    welding the tacked side halves to form a tank.

14. The method of claim 13 in which the step of welding the tacked side halves includes the step of stitch welding the tacked side halves.

15. The method of claim 13 which further includes the step of welding a reinforcing strip to the inside of the two halves after the side halves have been cut to form the tunnel.

16. The method of claim 13 which further includes the steps of
    forming a bottom rear end piece, and
    welding the formed rear end piece to the two side halves.

17. The method of claim 13 in which the step of hydroforming two side halves includes the further step of trimming excess material from the hydroformed side halves.

18. The method of claim 13 which includes the further steps of:
    forming mounting brackets;
    welding the formed mounting brackets to the welded tank;
    drilling holes in the mounting brackets;

drilling crossover holes and petcock holes in the welded tank;

placing tapped mounting bungs, crossover bungs, and petcock bungs in the respective drilled holes;

welding the mounting bungs, crossover bungs, and petcock bungs in their respective holes;

drilling a gas cap fitting hole;

positioning a gas cap fitting in the gas cap fitting hole; and welding the gas cap fitting in the gas cap fitting hole.

19. The method of claim 18 which includes the further steps of forming a rear end piece and welding the formed rear end piece to the two side halves.

* * * * *